Figure 1:
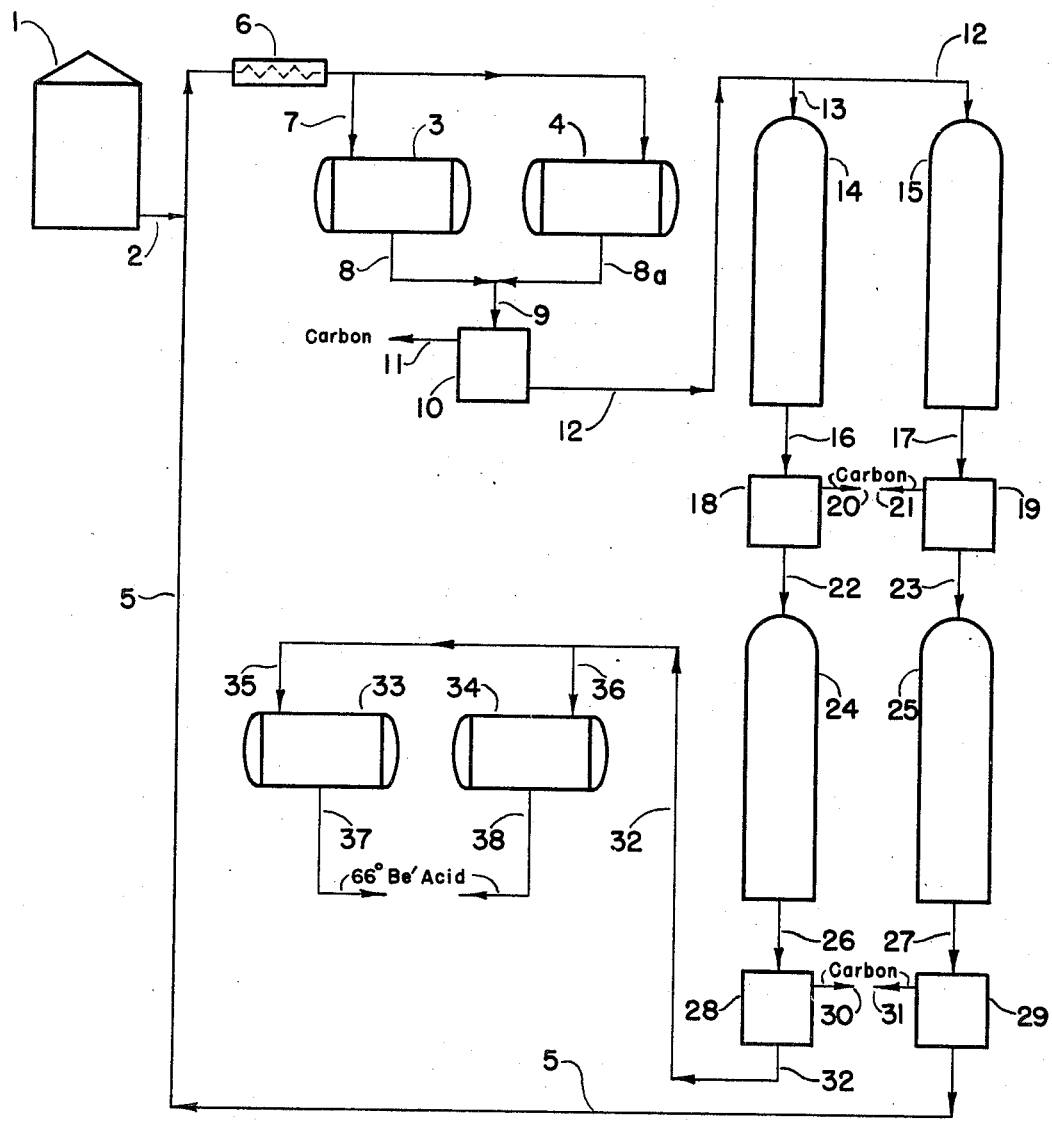

June 26, 1945.  F. A. FERGUSON  2,379,224

CONCENTRATION OF PETROLEUM ACID SLUDGES

Filed Feb. 15, 1943

Frank A. Ferguson INVENTOR.

BY P. J. Whelan
ATTORNEY.

UNITED STATES PATENT OFFICE 2,379,224

CONCENTRATION OF PETROLEUM ACID SLUDGES

Frank A. Ferguson, Baytown, Tex., assignor to Standard Oil Development Company, a corporation of Delaware Application February 15, 1943, Serial No. 475,905

7 Claims. (Cl. 23—172)

The present invention is concerned with a method for the recovery of concentrated sulfuric acid from petroleum acid sludges. More particularly, the invention is concerned with a method for treating weak acid recovered from petroleum acid sludges with a stronger acid prior to charging the weak acid to a concentration system. In its more particularly aspects, the invention relates to a method for treating a weak acid, recovered by hydrolysis of petroleum acid sludges, with acid of a strength greater than that of the weak acid being charged to the concentration system, the acid employed for treating the weak acid being, if desired, recycled from a later stage in the concentration operation.

In the refining of petroleum oils with sulfuric acid many different types of hydrocarbon compounds are treated, which necessarily results in sludges of widely different forms. In treating hydrocarbons with sulfuric acid numerous organic compounds such as sulfuric esters, sulfonic acids, and other organic constituents containing sulfur result. In order to recover acid from the multitudinous compounds resulting from the treatment of hydrocarbons with sulfuric acid, it is necessary to subject the acid sludge to hydrolysis which serves to break up the esters and effect a separation between the organic compounds and the dilute sulfuric acid. As a result of this hydrolysis step, a weak sulfuric acid containing organic matter separates and is recovered. This weak sulfuric acid recovered contains varying amounts of carbon, depending upon the type of oil and the amounts of sulfuric acid employed in treatment of the different types of oil. For example, acid recovered from the alkylation of isoparaffins with olefins may contain from 1 to 4% of carbon; while acid from other treatments of hydrocarbon oils may contain as much as 8 or 9% by weight of carbon. Weak acids usually encountered in the concentration of acids sludges resulting from the treatment of petroleum oils with sulfuric acid may be said in general to contain more than 1% by weight of carbon and to have a strength of about 30° Bé. It is to the concentration of such weak acids, as described hereinbefore, that the present invention is directed.

In my application U. S. Serial No. 311,071, which has matured into U. S. Patent 2,308,163, I have described an improved process whereby acid is concentrated more efficiently than was possible heretofore. In said patent I have described in some detail the prior art and how my improved method differs from it.

The present invention is a further improvement over the process described in my aforementioned patent, and it allows obtaining an increased capacity with a given size of equipment over that possible heretofore. Stating this in another way, it is possible to concentrate more acid to a given strength with the present invention than was heretofore possible in conventional type equipment. The present invention comprises, in its broadest aspects, the mixing of a weak sulfuric acid charged to a concentration system with a stronger sulfuric acid in an amount such that an acid mixture having a Baumé gravity of between 47 and 48.5° is charged to the concentration system. More specifically, the present invention resides in recycling from an intermediate stage in an acid concentration system an acid of about 58° Bé. which is admixed with a weak acid of about 30° Bé. to give an acid feed to the initial stage of an acid concentration system having a Bé. gravity of about 47 to 48.5°. It is pointed out that the strength of the acid charged to the initial stage of the concentration system is critical. If the acid is of a strength lower or higher than those strengths specified, the improved results of the present invention are not obtained.

The reason for this unexpected increase in capacity by mixing the weak acid with the stronger acid is not clearly understood. However, during the course of certain operations it was observed that the coke separated in various stages of the system, which will be described in more detail hereinafter, was of a fluffy, foamy nature which is easily separable from the acid. Heretofore the coke or carbonaceous material separated from the acid has been of a granular nature and would not separate as readily as the coke obtained in the present invention.

As mentioned hereinbefore, the present invention is a further improvement over the process described and claimed in my U. S. Patent 2,308,163 and briefly comprises recycling acid from the next to the last stage of my aforementioned process to the charge acid to the system. In short, this intermediate acid being of strength higher than that of the charge acid contacts the weak acid containing organic bodies and carbonaceous material and exerts a treating effect thereon. Just what effect the stronger acid has on the weak acid is not known, but it is believed to partially oxidize the organic compounds. It is believed that the oxidation of the organic constituent with acid, rather than solely by application of heat through introduction of hot combustion gases, results in a formation of the fluffy, foamy carbon hereinabove described.

Figure 2:
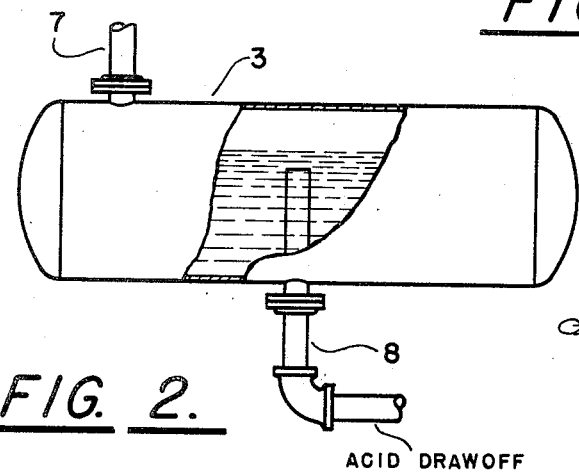

The present invention will be better understood by reference to the accompanying drawing, in which Figure 1 is a plan view showing a unit for continuous operation; and, Figure 2 is a detail in section of the draw-off employed from one of the zones in the acid concentration system.

Referring in detail to Figure 1, weak acid of about 30° Bé. from storage tank 1 at a temperature in the range between 80 to 100° F. is charged to mixing zones 3 and 4, which comprise the low stages of a conventional drum type apparatus for concentrating sulfuric acid. As will be well understood by those skilled in the acid concentration art, hot combustion gases are introduced into zones 3 and 4 and consequently increase the temperature of the weak acid charged thereto. Along with the weak acid charged to zones 3 and 4 is a stronger acid which is admixed with the weak acid in line 2 by means of line 5 connecting thereto. The two streams of acid are thoroughly mixed in incorporator 6 and flow to zones 3 and 4 by means of line 2 and branch line 7. In the low stages of the drum type apparatus, represented by zones 3 and 4, hot flue gases of about 1100° F. are fed thereto so that the acid leaving drums 3 and 4 by way of lines 8 and 8a is at a temperature of about 235° F. Lines 8 and 8a combine into one stream in line 9 which routes the acid to a separation pot 10 where the coke or carbonaceous material is skimmed off and withdrawn from the unit by way of line 11. The acid from pot 10 is routed through lines 12 and 13 to the low stages of two tower type concentration plants 14 and 15, respectively. These latter two stages operate in parallel and the temperature of the acid therein is about 235° F. and is maintained by introduction thereto of hot combustion gases in a manner well known in the art.

After being maintained at the aforesaid temperature, the acid is now concentrated to between about 51 and 53° Bé. and leaves the low stages 14 and 15 by way of lines 16 and 17, which connect to pots 18 and 19 in which further amounts of carbon are separated and removed by way of lines 20 and 21. Connecting to pots 18 and 19 are draw-off lines 22 and 23, which in turn connect to the high stages of a tower plant 24 and 25 where by introduction of hot combustion gases a temperature of about 265° F. is maintained and the acid is further concentrated to about 58° Bé. The acid of this high strength is discharged from the high stages 24 and 25 through lines 26 and 27 into pots 28 and 29 in which additional amounts of carbon of the fluffy, foamy nature, mentioned hereinbefore, are skimmed off and removed by means of lines 30 and 31. The acid withdrawn from pot 28 is charged by way of line 32 into the high stages of drum type apparatus 33 and 34 by way of branch lines 35 and 36. In high stages 33 and 34 the temperature of the acid is further raised to about 390° to about 400° F. by the introduction of hot flue gases at a temperature of about 1100° F. in a manner well known to the art. From stages 33 and 34 an acid of 66° Bé. is withdrawn through lines 37 and 38 for further use.

The essence of the present invention resides in charging from one of the later stages, as from pot 29, by way of line 5, strong acid, such as 58° Bé. acid, to meet the incoming weak acid from storage tank 1 in line 2, as has been described hereinabove.

Referring now to Figure 2, apparatus is described which is advantageous in the practice of the present invention. Numeral 3 designates one of the two low stages or mixer zones described with reference to Figure 1, and numeral 8 describes the acid draw-off line from said zone. Pipe 8 or 8a, as the case may be, extends into drum 3 or 4 to about the center thereof so that a weir effect is obtained. If it is attempted to simply draw off from the bottom of the vessel a bank of carbon builds up and plugs the outlet. By using a stand pipe, this is avoided since the carbon is kept in suspension by the agitation of the acid by the heating gases.

While the present invention has been described by reference to the improved embodiment of my afore-mentioned patent, it is to be understood that this type of operation is applicable to other types of acid concentration systems. For example, it may also be utilized in treating a weak acid charge to a vacuum type of concentration plant so that improved capacity is obtained. It is also applicable to various other types of acid concentration systems which are well known to those skilled in the art.

While it is desirable and economical to treat the incoming weak acid to a concentration system with an acid of a higher strength recycled from a later stage in the concentration system, it is to be clearly understood that the incoming weak acid may be treated with or admixed with a stronger acid from an extraneous source. For example, the weak acid of about 30° Bé. might be treated with the spent acid from an alkylation system having an acidity of about 85 to 90% sulfuric acid by weight.

The amount of recycle acid or acid used to treat the weak acid to the concentration system will vary widely, but is dependent upon the concentration of the strong acid employed as a treating reagent. While about one pound of 58° Bé. acid will be required to raise each pound of 30° Bé. to a 47 to 48.5° Bé. acid, it is understood that acids of higher or lower concentrations than 58° Bé. may be employed. When an acid of lower strength than 58° Bé. is employed, it is understood that larger amounts will be necessary, while with acids of higher strengths, the converse is true.

As a specific example of the advantages derived in practicing the present invention, an operation according to U. S. Patent 2,308,163 was compared with the present invention. When operating according to the aforementioned patent, it was possible to obtain 185 tons of 66° Bé. acid a day from the unit; while operating in accordance with the present invention 225 tons of 66° Bé. acid a day was obtained from an acid of 30° Bé., an increase of some 21% over that possible heretofore. It is to be realized that such an increase in capacity through a fixed size of equipment is quite important when the amount of sulfuric acid consumed in present day oil refinery operations is considered.

It is to be understood that the present invention is not to be restricted to any of the embodiments described herein which are given by way of illustration and not by way of limitation.

The nature and objects of the present invention having been thus described and illustrated, what I claim as new and useful and desire to secure by Letters Patent is:

1. In a method for concentrating dilute sulfuric acid containing carbonaceous material in which the acid is subjected to the action of hot gases, the steps which comprise mixing with the dilute acid as it is fed to the concentration system a sufficient quantity of sulfuric acid of a strength substantially greater than that of the dilute acid to bring the strength of the combined acids within the range of about 47° Bé. to about 48.5° Bé., continuously removing the mixed acids from the point of mixing and feeding them to the concentration system.

2. The process for concentrating dilute sulfuric acid containing carbonaceous material which comprises mixing with the dilute acid as it is fed to the concentration system a sufficient amount of a substantially stronger sulfuric acid to raise the strength of the mixture within the range of about 47° Bé. to about 48.5° Bé., continuously removing the mixed acids from the point of mixing and feeding them to the concentration system, heating said mixture of acids in stages, separating carbonaceous material between each stage and recovering from the final stage of said concentration system a concentrated acid.

3. A process in accordance with claim 2 in which the strong acid admixed with the dilute acid charged to the concentration system is obtained from a later stage in the concentration system.

4. A process for concentrating dilute sulfuric acid containing carbonaceous material in which the acid is concentrated in stages with carbon separation between stages, the steps of adding to the dilute acid as it is being charged into the initial concentration stage a sufficient quantity of hot stronger acid recovered from a subsequent concentration stage to bring the strength of the combined acids within the range of about 47° to 48.5° Bé., continuously removing the mixture of acids from the point of mixing and passing said mixture through the concentration stages.

5. In a process for concentrating sulfuric acid having a strength of about 30° Bé. and containing carbonaceous material in which the acid is concentrated in stages to a strength of about 66° Bé., the steps of adding to the 30° Bé. acid feed as it is fed to the initial concentration stage a sufficient quantity of hot stronger acid recovered from one of the later concentration stages to bring the strength of the combined acids within the range of about 47° to 48.5° Be., continuously removing the mixture of acids from the point of mixing and passing said mixture through the concentration stages.

6. A process for concentrating dilute sulfuric acid containing carbonaceous material which comprises charging a weak acid of about 30° Bé. in admixture with a stronger acid of about 58° Bé. to the low stage of a drum type acid concentration apparatus, withdrawing from said low stage an acid from which carbonaceous material is separated, dividing said withdrawn acid from said low stage and charging each stream separately to two or more tower type concentration systems, withdrawing from each of the low stages of the tower type concentration system an acid having a Bé. gravity of between about 51° and 53° Bé., separating carbonaceous material therefrom, charging said acid from which the carbonaceous material has been separated into the high stages of two or more tower type concentration systems, withdrawing from one of said high stages of said tower type concentration systems an acid having a strength of about 58° Bé., separating carbon from said withdrawn acid and charging said acid from which the carbon has been removed to the high stages of a drum type concentration system, withdrawing from the other high stage of the tower type concentration system an acid of 58° Bé., separating carbonaceous material therefrom, recycling said acid free of carbonaceous material for admixture with the charge to the low stages of the drum type concentration system, while recovering an acid of 66° Bé., from said high stages of the drum type system.

7. A process in accordance with claim 6 in which the amount of 58° Bé. acid recycled for admixture with the charge to the low stages of the drum type concentration system is in an equal amount to said weak acid charged thereto.

FRANK A. FERGUSON.